(12) United States Patent
White et al.

(10) Patent No.: US 9,334,592 B2
(45) Date of Patent: May 10, 2016

(54) PROCESS FOR THE PRODUCTION OF A HYDROENTANGLED PRODUCT COMPRISING CELLULOSE FIBERS

(75) Inventors: Pat White, Sharnford (GB); Haio Harms, Gmunden (AT); Malcolm Hayhurst, Bulkington (GB)

(73) Assignee: Lenzing Aktiengesellschaft, Lenzing (AT)

( * ) Notice: Subject to any disclaimer, the term of this patent is extended or adjusted under 35 U.S.C. 154(b) by 638 days.

(21) Appl. No.: 12/741,496

(22) PCT Filed: Oct. 10, 2008

(86) PCT No.: PCT/AT2008/000394
§ 371 (c)(1),
(2), (4) Date: Feb. 9, 2011

(87) PCT Pub. No.: WO2009/059342
PCT Pub. Date: May 14, 2009

(65) Prior Publication Data
US 2011/0124258 A1 May 26, 2011

(30) Foreign Application Priority Data
Nov. 7, 2007 (AT) ................................ A 1798/2007

(51) Int. Cl.
| | |
|---|---|
| *D01D 5/06* | (2006.01) |
| *D01F 2/02* | (2006.01) |
| *D04H 3/013* | (2012.01) |
| *D01D 5/098* | (2006.01) |
| *D01D 5/14* | (2006.01) |
| *D01F 2/00* | (2006.01) |
| *D04H 3/007* | (2012.01) |
| *D04H 3/033* | (2012.01) |
| *D04H 3/11* | (2012.01) |
| *D04H 3/153* | (2012.01) |
| *D04H 13/00* | (2006.01) |

(52) U.S. Cl.
CPC ............ *D04H 3/013* (2013.01); *D01D 5/0985* (2013.01); *D01D 5/14* (2013.01); *D01F 2/00* (2013.01); *D04H 3/007* (2013.01); *D04H 3/033* (2013.01); *D04H 3/11* (2013.01); *D04H 3/153* (2013.01); *D04H 13/00* (2013.01); *Y10T 442/689* (2015.04)

(58) Field of Classification Search
CPC ............ D01D 5/06; D01F 2/02; D04H 3/11
USPC ................. 264/103, 178 F, 187, 203, 210.8, 264/211.12, 211.14, 555; 28/104
See application file for complete search history.

(56) References Cited

U.S. PATENT DOCUMENTS

| | | | |
|---|---|---|---|
| 5,725,821 A * | 3/1998 | Gannon et al. | 264/203 |
| 5,780,369 A * | 7/1998 | Allison et al. | 28/104 X |
| 6,042,769 A | 3/2000 | Gannon et al. | |
| 6,197,230 B1 | 3/2001 | Pierre et al. | 264/6 |
| 7,314,570 B2 | 1/2008 | Zikeli et al. | 210/683 |
| 2003/0143912 A1 | 7/2003 | Black et al. | 442/327 |
| 2004/0013859 A1* | 1/2004 | Annis et al. | 428/195.1 |
| 2004/0099981 A1 | 5/2004 | Gerking | 264/103 |
| 2004/0121683 A1* | 6/2004 | Jordan et al. | 442/182 |
| 2004/0248494 A1 | 12/2004 | Hartgrove et al. | 442/408 |
| 2005/0056956 A1 | 3/2005 | Zhao et al. | 264/37.24 |
| 2005/0278912 A1 | 12/2005 | Westland et al. | 28/104 |
| 2008/0075760 A1 | 3/2008 | Suzuki et al. | |
| 2008/0287025 A1 | 11/2008 | Ebeling et al. | 442/400 |
| 2009/0004474 A1* | 1/2009 | Luo | 428/397 |
| 2009/0324926 A1* | 12/2009 | Luo | 428/311.71 |

FOREIGN PATENT DOCUMENTS

| | | |
|---|---|---|
| DE | 10 140 772 A1 | 3/2003 |
| EP | 1 358 369 B1 | 8/2004 |
| JP | H10504858 A | 5/1998 |
| JP | 2005248365 A | 9/2005 |
| JP | 2006057211 A | 3/2006 |
| JP | 2007046223 A | 2/2007 |
| JP | 2007270364 A | 10/2007 |
| WO | WO 95/35400 A1 | 12/1995 |
| WO | WO 98/07911 A1 | 2/1998 |
| WO | WO 98/26122 A1 | 6/1998 |
| WO | WO 99/47733 A1 | 9/1999 |
| WO | WO 99/64649 A1 | 12/1999 |
| WO | WO 02/052070 A2 | 7/2002 |
| WO | WO 03/023106 A2 | 3/2003 |
| WO | WO 03/056088 A1 | 7/2003 |
| WO | WO 2004/053216 A1 | 6/2004 |
| WO | WO 2005/106085 A1 | 11/2005 |
| WO | WO 2006/035458 A1 | 4/2006 |
| WO | WO 2007/000319 A1 | 1/2007 |
| WO | WO 2007/124521 A1 | 11/2007 |

OTHER PUBLICATIONS

M.G. Kamath et al., Spunlace(Hydroentanglement), www.engr.utk.edu/mse/Textiles/Spunlace.htm—19 pages, (Apr. 2004).
Office Action issued in Japanese Patent Application No. 2010-531374 dated Dec. 11, 2012.

* cited by examiner

*Primary Examiner* — Leo B Tentoni
(74) *Attorney, Agent, or Firm* — Fitzpatrick, Cella, Harper & Scinto

(57) ABSTRACT

The present invention relates to a process for the production of a hydroentangled product comprising cellulose fibers, wherein a Lyocell melt-blown web is subjected to a treatment by fine high-pressure jets of water, characterized in that
 the web is subjected to said fine high-pressure jets in at least three treatment steps
 the pressure of said high-pressure jets is 75 bar or less in each of said treatment steps.
Furthermore, the invention relates to products obtainable by said products, and uses thereof.

8 Claims, No Drawings

PROCESS FOR THE PRODUCTION OF A HYDROENTANGLED PRODUCT COMPRISING CELLULOSE FIBERS

BACKGROUND OF THE INVENTION

1. Field of the Invention

The present invention relates to a process for making a hydroentangled cellulose product comprising cellulose fibers and to products obtainable by said process.

It is known to produce nonwoven webs by so-called "melt-blowing" processes from various synthetic polymers.

2. Description of the Related Art

It is, furthermore, known to produce nonwoven webs made by a melt-blowing process employing a cellulose solution in N-methyl-morpholine-N-oxide ("NMMO") from, inter alia, WO 98/26122, WO 99/47733, WO 98/07911, U.S. Pat. No. 6,197,230, WO 99/64649, WO 05/106085 EP 1 358 369, WO 02/52070 and US 2005/56956. Such products are also generally mentioned in DE 101 40 772 A1 and in WO 2007/000319 A1.

The melt-blowing processes disclosed in the above-referenced documents are characterized in that extruded threads of the cellulose solution in NMMO are picked up by a gas stream flowing in a generally parallel direction to the path of the filaments. The cellulose solution, which is ejected through the orifices, is formed to liquid strands or latent filaments, which are drawn (or significantly decreased in diameter and increased in length and may be split into several sub-filaments) by the gas stream.

The filaments are then collected, for example on a rotating drum, whereby a web is formed.

In the following, this process is referred to as "Lyocell melt-blowing process". Nonwoven melt-blown webs made by the Lyocell melt-blowing process will in the following be referred to as "Lyocell melt-blown webs". For the purposes of the present invention, the term "Lyocell melt-blowing process" encompasses both processes by which endless filaments are obtained (such processes also referred to in the literature as "spunbonding processes"), processes by which fibres of a discrete length are obtained and processes by which mixtures of endless filaments and fibres of discrete length are obtained.

In contrast thereto, WO 06/035458 discloses a process for the production of so-called "spunlaid nonwovens", i.e. the extruded filaments are not stretched by a gas stream, but by the flow of the precipitation fluid.

Various means of bonding nonwoven webs are known nowadays. These means, depending on the nature of the nonwoven web employed, comprise chemical bonding, thermal bonding, needle-bonding and bonding via hydroentanglement.

WO 2007/124521 (not pre-published) discloses a process wherein a Lyocell melt-blowing process is combined with a hydroentanglement step, whereby it is possible to produce bonded webs with excellent properties for a variety of end-uses, with the additional advantage of various synergistic effects.

The process for the production of a hydroentangled product comprising cellulose fibers according to WO 2007/124521 comprises the steps of extruding a solution comprising cellulose dissolved in an aqueous tertiary amine-oxide through a spinneret into an air gap, thereby forming filaments contacting said filaments in the air gap with a medium which at least partially coagulates the filaments drawing said filaments by means of a gaseous stream collecting and precipitating said filaments in order to form a web bonding said web by means of a hydroentanglement process.

By this process, stable lightweight webs resulting from the melt-blown process can be further processed into a bonded web in an especially convenient way.

According to WO 2007/124521, a Lyocell melt-blown web may be bonded using a spunlace line with 3 pressure heads, the first head operating at around 20 bars, the second head operating at the upper side at around 100 bar and the third head operating at the lower side at around 100 bar. The line speed may be around 40 m/min. If the hydroentanglement step is conducted in an overall continuous process on a never-dried Lyocell melt-blown, the production speed of the spunlace line can be adjusted according to the rate of supply of the web.

SUMMARY OF THE INVENTION

It is an object of the present invention to even further enhance the properties of hydroentangled Lyocell melt-blown webs.

This object is solved by a process for the production of a hydroentangled product comprising cellulose fibers, wherein a Lyocell melt-blown web is subjected to a treatment by fine high-pressure jets of water, said process being characterized in that the web is subjected to said fine high-pressure jets in at least three treatment steps the pressure of said high-pressure jets is 75 bar or less in each of said treatment steps.

DETAILED DESCRIPTION OF THE INVENTION

It has surprisingly been found that by modifying certain parameters of the hydroentanglement process the properties of Lyocell melt-blown webs can be significantly enhanced. Especially, products obtainable by the process according to the invention exhibit enhanced strength as compared with prior art products.

This is quite surprising because the process according to the present invention is, inter alia, characterized in that the pressure that is exerted onto the web by the high-pressure jets is comparatively small, i.e. at 75 bar or less. It is, however, well-known that normally the strength of hydroentangled products increases with the water pressure (cf. e.g. Kamath et al. "Spunlace (Hydroentanglement)" http://web.utk.edu/~mse/pages/Textiles/Spunlace.htm).

According to the present invention, the web is subjected to said fine high-pressure jets in at least three treatment steps. By "treatment step", the passage of the web below or above a jet manifold, from which the fine high-pressure water jets are directed to the web, is meant. It is understood that several treatment steps can be performed by passing the web through one single jet manifold for several times and/or by passing the web through several jet manifolds.

The term "jets of water" is to be understood as referring to jets consisting essentially of water, whereby the jets may, however, also contain minor amounts of other substances, such as modifying agents.

Preferably, the web is subjected to at least four treatment steps. The web may, for example, be subjected to five treatment steps.

According to a further preferred embodiment of the present invention, the pressure of said high-pressure jets is 55 bar or less in each of said treatment steps. Especially preferred, the pressure may be 50 bar or 30 bar. Very good results have been achieved with 5 treatment steps with a pressure of 30 bar per step or 5 treatment steps with a pressure of 50 bar per step, respectively.

For the production of very lightweight products with an area weight of 10 g/m² or below, pressures of around 20 bar have been proven to be suitable.

In a further embodiment, each side of the web may be subjected to at least one treatment step. It is known that in hydroentanglement processes both sides of a web may be subjected to at least one treatment by the water jets. For example, the upper side of the web may be subjected to two treatments, and the lower side of the web may be subjected to one treatment. It is, however, also possible within the frame of the present invention to subject only one side of the web to the water jets.

The processing speeds during the hydroentanglement process can be chosen by the skilled artisan according to his general knowledge. Processing speeds around 20 m/min have been proven to be suitable.

The Lyocell melt-blown web may especially be produced by the processes known from WO 2007/124521, WO 02/52070 or US 2005/56956.

According to a further preferred embodiment of the present invention, the Lyocell melt-blown web is produced by a process comprising the steps of (a) extruding a solution comprising cellulose dissolved in an aqueous tertiary amine-oxide through a spinneret into an air gap, thereby forming filaments (b) contacting said filaments in the air gap with a medium which at least partially coagulates the filaments.

(c) drawing said filaments in the air gap by means of a gaseous stream (d) collecting and precipitating said filaments in order to form the web.

Preferably, said medium used in step (b) is a vapour mist, preferably an aqueous mist.

Step (b) refines the overall process by treating the filaments in the air gap with a partially coagulating medium. Treating the filaments in the air gap with a vapour mist is known, for example, from WO 99/64649.

By way of step (b), the filaments are at least partly precipitated before forming a web. It has been shown that this measure imparts to the webs thusly produced a more soft and textile-like performance, as compared with the more "paper-like" performance of products which are formed by coagulation of the web only after forming the web.

It is, furthermore, believed that by at least partly precipitating the filaments before forming a web, the filaments in the web do not stick together in the same degree as in a web which is formed before precipitating the filaments (non-precipitated filaments spun from a dope of cellulose in NMMO are quite sticky). This facilitates and enhances the effect of the hydroentanglement process. This is because for a hydroentanglement process to work effectively, individual filaments should be free to move within the web, i.e. they should not be fused at overlaps.

In a further preferred embodiment, the hydroentanglement process is performed on a never-dried web. Under "never-dried web", one understands a web which, after having been formed by collecting and precipitating the filaments, has not yet been dried.

This embodiment brings with it various synergistic effects. In previous processes, first a fiber web was produced which (if produced by a wet route) had to be dried and provided to an external hydroentanglement facility in the dried state.

By combining the melt-blown process and hydroentanglement process without prior drying of the product, both energy, previously needed for drying the original web, and water (previously needed to re-wet the product) can be saved.

Furthermore, as known as such, in the Lyocell process residual solvent must be washed out by aqueous washing liquids. The hydroentanglement process, employing mostly water as the treatment liquid, therefore may act as a further efficient washing step in addition to any prior washing steps, thereby reducing the amount of washing otherwise needed to wash the web.

The preferred embodiment of carrying out the hydroentanglement step on a never-dried web will in the following be referred to as "Online-bonding".

The process according to the invention may further comprise the step of (e) treating said web by a treatment selected from the group consisting of embossing, perforating and marking the web.

Means to emboss, perforate or otherwise mark a web (such as by applying coloured patterns or the like) are known as such to the skilled artisan. It is possible to perform step (e) on a bonded web, that has already been bonded previously.

In a preferred embodiment, step (e) is performed together with the hydroentanglement process. For example, by varying the water pressure during the hydroentanglement process, such as by periodical variation or by variation of the high pressure in different parts across the web marking effects and different densities of the webs, creating an embossed impression, may be achieved.

A further embodiment of the process according to the invention comprises the step of (f) admixing a further material to either of the solution comprising cellulose dissolved in an aqueous tertiary amine-oxide, a precursor thereof and/or said web.

Under "precursor", any starting or intermediate product of the Lyocell process is meant, such as e.g. the cellulose pulp used for making the solution, the NMMO solvent, a suspension of the pulp and the NMMO solvent used as an intermediate product before making the solution, etc.

Said further material may preferably be selected from the group consisting of cellulosic materials, such as cellulosic fibers and pulp, e.g. fluff pulp; non-cellulosic polymers, especially non-cellulosic polymer fibres, bi-component fibres; modifying substances, such as dyestuffs, antibacterial products, ion-exchanger products, active carbon, nanoparticles, lotions, fire-retardant products, superabsorbers, impregnating agents, dyestuffs, finishing agents, crosslinking agents, grafting agents, binders; and mixtures thereof.

Under "binder", an agent being capable of further bonding the web e.g. by thermosetting is meant.

The skilled artisan is well aware which of the above-referenced materials may be added in which step of the Lyocell melt-blown process, and in which manner.

Especially, step (f) may be conducted before the hydroentanglement process. Hence, modifying materials are added to the web or its precursors before the bonding step. After bonding of the web, the materials are more intimately incorporated in the web as compared to a process wherein the materials are added only after bonding of the web.

Said further material can also be admixed to the web by dissolving or dispersing said material in the hydroentanglement fluid employed. This means, that e.g. a modifying material is added to the hydroentanglement fluid and is incorporated into the web at the same as the bonding via hydroentanglement takes place.

A further embodiment of the process according to the invention comprises the step of (g) attaching to said web on one or both sides a layer of a further material, especially a fiber-, film- or web-layer.

With this embodiment, it is possible to produce composite materials made up by e.g. one layer of the cellulosic web produced according to the invention and one or more additional layers on one or both sides of the web. "Sandwich" constructions, wherein the cellulosic web is embedded between two, optionally different, layers of e.g. a film or web-like material, are possible.

Said layer may essentially consist of a material selected from the group consisting of cellulosic materials, such as cellulosic fibers and pulp; non-cellulosic polymers; and mixtures thereof.

Examples of composite or "sandwich" products include composites with layers of synthetic polymers, cellulosic fluff pulp, nonwoven webs of cellulose or synthetic polymer fibers, bicomponent fibres, webs of cellulose pulp, such as airlaid pulp, webs or fabrics of high tenacity fibres, hydrophobic materials, high performance fibres (such as bullet proof materials, temperature resistant materials or flame retardant materials, layers imparting changed mechanical properties to the final products (such as Polypropylene or Polyester layers), biodegradable materials (e.g. films, fibres or webs from Polylactic acid), and/or high bulk materials (such as Polyacrylnitrile).

Furthermore, it is possible to produce composites where one layer of e.g. a synthetic polymer material is embedded between two or more layers of cellulosic webs produced according to the invention. For example, a sandwich construction with a strong, but physiologically non pleasing, e.g. hydrophobic layer embedded between two cellulosic web layers may be produced. A further example is a sandwich product comprising a layer of airlaid pulp with one or two layers of cellulosic melt-blown web.

Other alternatives comprise composites such as for diapers or sports applications, where, depending on the requirements of the products, either a hydrophilic or a hydrophobic layer is to be in contact with the skin.

In one embodiment of the present invention, step (g), i.e. attaching one or more layers to the cellulosic web, is conducted before the hydroentanglement process.

Especially, it is possible to produce a melt-blown Lyocell web, contacting this web with a layer of e.g. a polymeric fibre material, and then strengthening the composite material by the hydroentanglement process.

It is also possible to combine several layers of Lyocell melt-blown webs.

To produce various "sandwich" constructions, it is possible to arrange several extrusion heads for extruding the cellulose solution in NMMO, thereby producing several layers of cellulosic melt-blown webs and to suitably arrange sources of additional layers, such as film, fibre or web layers such as to contact the various layers in the desired order, finally obtaining a "sandwich" product with the desired composition of different layers.

Such additional source of an additional layer may as well be an extrusion head for producing a melt-blown or spun-laid product of a synthetic polymer fiber material.

For example, a source for a polypropylene non-woven web can be combined with a source of a Lyocell melt-blown web in such a way that the non-woven polypropylene web is fed onto the never-dried Lyocell melt-blown web. The combined web may then be hydroentangled.

All this can be accomplished "online", i.e. in the framework of the Lyocell melt-blown process, with the preferred option to strengthen the composite so obtained "online" via the hydroentanglement process according to the invention.

If nonwoven webs are used as a further layer, these may be pre-bonded or not yet bonded. If such web is not yet bonded, it may be bonded by means of the hydroentanglement process.

Furthermore, a non-woven waste material may be combined with the melt-blown Lyocell web, e.g. as an additional layer, or by employing a fabric comprising strips of a non-woven waste material woven into said fabric, as e.g. proposed in WO 04/53216.

The use of bicomponent fibres, being incorporated in the cellulosic web and/or being part of one or more of the layers attached thereto, respectively, enables the production of products with a defined ratio of machine direction (MD) to cross direction (CD) orientation, such as e.g. known from WO 03/56088.

After the hydroentanglement process, the bonded web may be further washed, dried, and collected to rolled goods.

In a further aspect, the present invention is directed to a hydroentangled melt-blown web comprising cellulose fibers, obtainable according to the process of the invention. The hydroentangled web obtainable according to the present invention exceeds previously known webs especially in terms of its strength.

Typically, a hydroentangled melt-blown web according to the invention may exhibit a weight of 10 $g/m^2$ to 250 $g/m^2$, preferably 30 $g/m^2$ to 150 $g/m^2$, especially preferred 50 $g/m^2$ to 120 $g/m^2$.

A preferred embodiment hydroentangled web according to the present invention, however, is characterized in that it exhibits an area weight of below 10 $g/m^2$. Hydroentangled Lyocell melt-blown webs with an area weight of below 10 $g/m^2$ and having sufficient strength to be used in various applications, i.e. being at least self-supporting, have not been disclosed so far.

The web according to the invention may be present in a perforated, embossed and/or marked state.

In one embodiment of the present invention, the web essentially consists of cellulose.

In an alternative embodiment, the web according to the present invention contains a further material selected from the group consisting of cellulosic materials, such as cellulosic fibers and pulp; non-cellulosic polymers, especially non-cellulosic polymer fibres, bi-component fibres; modifying substances, antibacterial products, ion-exchanger products, nanoparticles, lotions fire-retardant products, absorbency-improving additives, such as superabsorbent resins, carbon resins such as active carbon, graphite, carbon for electrical conductivity; X-ray contrast resins, luminescent pigments, dyestuffs, resins for improvement of the chemical and mechanical stability, finishing agents, crosslinking agents, grafting agents, bonding agents; and mixtures thereof.

Yet one further aspect of the present invention relates to an article containing a web according to the present invention, wherein said web has attached to one or both sides thereof a layer of a further material, especially a fiber-, film- or web-layer.

As already described above, said layer may essentially consist of a material selected from the group consisting of cellulosic materials, such as cellulosic fibers and pulp; non-cellulosic polymers, especially non-cellulosic polymer fibres, bi-component fibres; and mixtures thereof.

The web and the article according to the present invention may be used as a product selected from the group consisting of wipes, filters, absorbent hygiene products, medical products, geotextiles, clothing, building products, automotive products, furnishings, industrial products, leisure and travel products, school and office products; or as a part of such product.

Especially the web and/or the article according to the present invention may be used in a product selected from the group consisting of wipes, such as baby wipes, kitchen wipes, wet wipes, cosmetic wipes, hygiene wipes, cleaning wipes, glass wipes, lens cleaning wipes, polishing wipes, e.g. for cars and furniture, dust wipes, industrial wipes, intimate wipes, toilet wipes, floor wipes, glass wipes, medical wipes, such as cleansing and pre-operative wipes, dusters and mops; filters, such as air filters, e.g. HVAC, HEPA and ULPA filters, flue gas filters, liquid filters, coffee filters, tea bags, coffee bags, food filters, water purification filters, blood filters, cigarette filters, cabin filters, fuel filters, oil filters, cartridge filters, vacuum filters, vacuum cleaner bags, dust filters, hydraulic filters, kitchen filters, fan filters, beer filters, milk filters, liquid coolant filters, fruit juices filters, face masks and active carbon filters; disposable absorbent products such as acquisition layers, coverstock, distribution layers, absorbent covers, sanitary napkins, panty liners, diapers, incontinence products, towels, tampons, sanitary pads, backsheets, leg cuffs, flushable products, pads, nursing pads, dispoable underwear, training pants, cosmetic removal pads and washcloths; medical products, such as disposable caps, gowns, masks and shoe covers, wound care, sterile packaging, coverstock, dressing materials, one way clothing, dialysis products, nasal strips, adhesive for dental plates, drapes, wraps and packs, sponges dressing and wipes, bed linen, transdermal drug delivery, shrouds, underpads, procedure packs, heat packs, ostomy bag liners, fixation tapes and incubator mattresses; structural and/or reinforcement products such as geotextile products, capillary matting, water purification products, irrigation control products, asphalt overlay, soil stabilisation products, drainage products, e.g. drainage channel liners, sedimentation and erosion control products, pond liners, impregnation base products, ground stabilisation products, pit linings, seed blankets, weed control fabrics, greenhouse shading, root bags and biodegradable plant pots; building products, such as roofing and tile underlay, underslating, thermal and noise insulation, house wraps, facings for plaster board, pipe wraps, concrete moulding layers, foundations and ground stabilisation products, vertical drainages, shingles, roofing felts, noise abatement materials, reinforcement materials, sealing materials, mechanical damping materials, fire protection materials, support material for bitumen coating, reinforced concrete and reinforced polymers; automotive products, such as cabin filters, boot liners, parcel shelves, heat shields, shelf trim, moulded bonnet liners, boot floor covering, oil filters, headliners, rear parcel shelves, decorative fabrics, airbags, silencer pads, insulation materials, car covers, underpadding, car mats, tapes, backing and tufted carpets, seat covers, door trim, needled carpets, auto carpet backings, and reinforced polymers; furnishing products, such as furniture constructions, insulators to arms and backs, cushion thickings, dust covers, linings, stitch reinforcements, edge trim materials, bedding constructions, quilt backing, spring wraps, mattress pad components, mattress covers, window curtains, wall coverings, carpet backings, lampshades, mattress components, spring insulators, sealings, pillow thicking, mattress thicking and high loft webs for filling applications such as disposable duvets; industrial products, such as electronic products, floppy disc liners, cable insulation, abrasives, insulation tapes, conveyor belts, noise absorbent layers, air conditioning products, battery separators, acid systems, anti slip mattings, stain removers, food wraps, adhesive tapes, sausage casings, cheese casing, artificial leather, oil recovery booms and socks, papermaking felts, kettle descaler bags, and flame barriers; travel or leisure products, such as sleeping bags, tents, luggage, handbags, shopping bags, airline headrests, CD-protection products, pillowcases, sandwich packaging and surf boards; and school or office products, such as book covers, mailing envelopes, maps, signs and pennants, towels, flags and bank notes; or as part of such product.

Preferred embodiments of the present invention are now discussed in more detail on the basis of the following non-limiting examples:

EXAMPLES

Never-dried meltblown Lyocell webs of various weights were prepared using the process disclosed in WO 2007/124521, in particular including a partial coagulation prior to the filament formation (step (b) as mentioned above). These webs were hydroentangled under various process conditions. Strength testing of the resulting webs as compared with a non-hydroentangled product (Reference strength=100%) gave the following averaged results:

Example 1

50 g/m$^2$ Cellulose Web, 20 m/min Processing Speed

| Web Sample | Hydroentanglement Conditions | | Web Strength | |
|---|---|---|---|---|
| | Passes | Pressure (bar) per pass | Machine Direction | Cross Direction |
| As produced (no hydroentanglement) | None | | 100% | 100% |
| Hydroentanglement as disclosed in prior art (WO 2007/124521) | 3 | 20/100/100 | 126% | 126% |
| Trial 1 | 4 | 30/70/70/70 | 141% | 122% |
| Trial 2 | 5 | 50/50/50/50/50 | 163% | 178% |
| Trial 3 | 5 | 30/30/30/30/30 | 176% | 170% |

It can clearly been seen that the products of the process according to the present invention (Trials 1, 2 and 3, respectively) exhibit a significantly better strength than the products of the prior art.

Example 2

5 g/m$^2$ Microfiber Cellulose Web, 20 m/min Processing Speed

| Web Sample | Hydroentanglement Conditions | | Web Strength | |
|---|---|---|---|---|
| | Passes | Pressure (bar) per pass | Machine Direction | Cross Direction |
| As produced (no hydroentanglement) | None | | 100% | 100% |
| Hydroentanglement as disclosed in prior art (WO 2007/124521) | 3 | 20/100/100 | Web damaged | |
| Trial 4 | 3 | 25/20/20 | 250% | 200% |

The web produced according to trial 4 (according to the invention) possessed sufficient strength in order to be used for various applications. In contrast thereto, with a hydroentanglement process as disclosed in WO 2007/124521, it was not possible to produce a product with sufficient strength.

What is claimed is:

1. A process for the production of a hydroentangled product comprising fibers, wherein the fibers consist essentially of fibers obtained from cellulose dissolved in an aqueous tertiary amine-oxide, said process comprising subjecting a Lyocell melt-blown web to a treatment by fine high-pressure jets of water, the improvement wherein the web is subjected to said fine high-pressure jets in at least three treatment steps, wherein the pressure of said high-pressure jets is 75 bar or less in each of said treatment steps.

2. The process according to claim 1, wherein the web is subjected to at least four treatment steps.

3. The process according to claim 1, wherein each side of the web is subjected to at least one treatment step.

4. The process according to claim 1, wherein said web is produced by a process comprising the steps of (a) extruding a solution comprising cellulose dissolved in an aqueous tertiary amine-oxide through a spinneret into an air gap, thereby forming filaments;
(b) contacting said filaments in the air gap with a medium which at least partially coagulates the filaments;
(c) drawing said filaments in the air gap by means of a gaseous stream; and
(d) collecting and precipitating said filaments in order to form the web.

5. The process according to claim 4, wherein said medium is a vapour mist.

6. The process according to claim 1, wherein said web is a never-dried web.

7. The process according to claim 5, wherein said medium is an aqueous mist.

8. The process according to claim 1, wherein the pressure of said high-pressure jets is 55 bar or less in each of said treatment steps.

* * * * *